Figure 1:
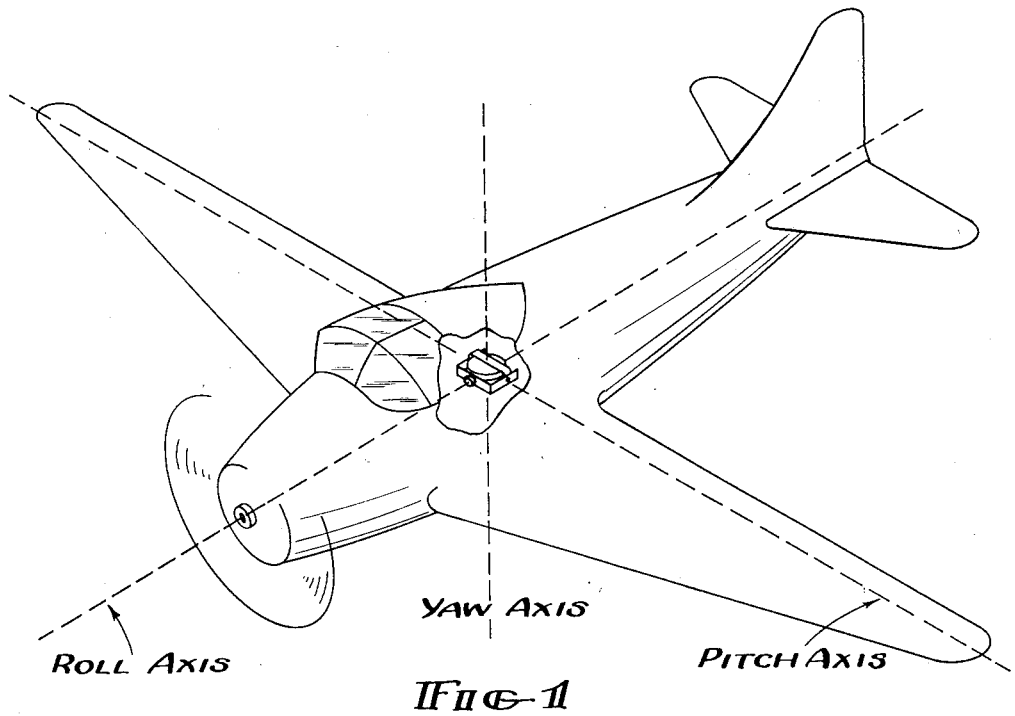

INVENTOR.
DWIGHT L. PRINGLE
BY
ATTORNEY

United States Patent Office 2,791,738
Patented May 7, 1957

2,791,738

METHOD OF RUDDER CONTROL THAT GIVES COORDINATED TURNS AT ALL AIR SPEEDS

Dwight L. Pringle, Cedar Rapids, Iowa, assignor to Collins Radio Company, Cedar Rapids, Iowa, a corporation of Iowa Application April 2, 1953, Serial No. 346,423

9 Claims. (Cl. 318—489)

This invention relates in general to automatic controls for aircraft and in particular to apparatus which automatically coordinates the rudder with the bank angle and velocity at all air speeds.

As automatic pilots have been used more and more, they have been assigned various jobs other than merely flying straight and level. When flying straight and level with an automatic pilot, the rudder is generally used to hold the aircraft on a constant heading. This is accomplished by making the rudder displacement proportional to any deviation from said heading as measured by a directional gyroscope, or proportional to the rate of deviation as measured by a yaw rate gyroscope.

In order to execute a coordinated turn, the rudder is required to assist in establishing the proper rate of turn. Some sort of computing circuit is required to determine what the rudder action should be when the aircraft is maneuvering. In simple automatic pilots the rate of turn is made proportional to the aircraft bank angle by displacing the rudder proportional to the difference between bank angle signal and rate of turn signal. This gives coordinated turns at one airspeed, but results in considerable sideslip if the airspeed is changed.

This invention relates to a simple method of correcting this deficiency, allowing the aircraft to make well coordinated turns at all airspeeds.

The design of conventional aircraft is such that if the rudder were locked in a streamlined position, the aircraft would eventually assume a coordinated condition regardless of the bank angle. That is, sideslip would be of short duration, being soon removed by the aerodynamic forces acting upon the vertical surfaces of the aircraft. It can therefore be seen that the rudder need be operated only within a limited frequency spectrum which does not include zero frequency. Assuming the aircraft is properly trimmed, it is never necessary to maintain a rudder deflection for any prolonged period of time. It is therefore possible to insert a filter in the rudder controlling channel which will not pass signals of zero frequency and will attenuate extremely low frequencies. If this filter is such that it does not greatly attenuate frequencies near the natural yawing frequency of the aircraft, it will not adversely affect the operation of the automatic pilot.

A feature of this invention is found in the provision for the insertion of a high pass filter between the control motor and the vertical gyro bank pick-off and rate of turn gyro pick-off.

Figure 2:
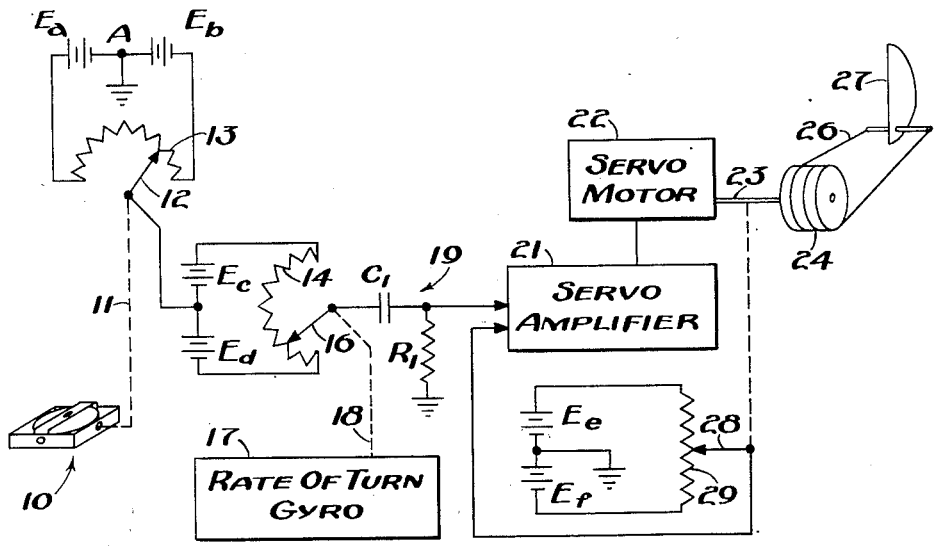

Further features, objects and advantages of this invention will become apparent from the following description and claims when read in view of the drawings, in which:

Figure 1 illustrates an aircraft with the pitch, roll and yaw axes illustrated, and Figure 2 is a schematic view of the control apparatus of this invention.

In the exemplary embodiment the inventive rudder control system is shown separately from means for initiating the maneuver, such as a turn. Such means may be of the type used with conventional craft. For example, in light aircraft the initiating means may be the control stick for displacing the ailerons. In aircraft equipped with an autopilot, such means may be a turn control knob, or the maneuver may be initiated by reason of accidental departure of the craft from a course set on the autopilot. It is to be understood that this invention may be made a part of or incorporated into autopilot systems of known types.

As is well known to those skilled in the aircraft art, turns are accomplished by movement of the ailerons to establish a bank and the rudder is used to produce coordinated flight. If it is desired to bank the aircraft to the left, for example, the controls are moved so as to move the ailerons to push one wing downwardly and the other one upwardly. Simultaneously rudder is added in the direction of turn to prevent yawing in the direction opposite to the desired turn. Once the bank angle has been established, the ailerons and rudder are returned to a neutral position and the aircraft will continue to turn at a fixed rate depending on bank angle and velocity. The transient conditions which exist when a turn is established or removed, should be accomplished in a coordinated fashion so as to maintain maximum lift and control. In other words, if the ailerons are moved and the rudder remains in its central position, the aircraft will yaw first to the right in a skid before establishing the correct rate of turn to the left.

Apparatus for coordinating the rudder with the bank angle for all air speeds is illustrated in Figure 2. It is to be particularly noted that the amount of rudder will not be the same at various air speeds because of the complicated reactions described above, but that it should return to zero position after the turn is established at all air speeds.

Figure 2 illustrates a vertical gyro 10 which has an output shaft 11 which has a position proportional to bank angle and which is connected to a slide contact 12 engageable with a potentiometer 13.

A pair of voltage sources $E_a$ and $E_b$ are connected in series across the potentiometer 13. Point A between $E_a$ and $E_b$ is grounded. The voltages $E_a$ and $E_b$ are chosen so as to produce equal electromotive forces.

A second pair of voltage sources $E_c$ and $E_d$ are connected in series and the contact 12 is electrically connected to their connection point. A second potentiometer 14 is connected across the batteries $E_c$ and $E_d$ and a contact 16 is engageable therewith.

A rate of turn gyro 17 is carried on the aircraft and has an output shaft 18 which has a position proportional to the rate of turn of the craft and which is connected to the contact 16.

A high pass filter 19 comprising a condenser $C_1$ in series with the line and a resistor $R_1$ connected between the line and ground, is connected to the contact 16. A servo amplifier 21 receives an input from the filter 19 and is connected to a servomotor 22.

Servomotor 22 has an output shaft 23 which carries a pulley 24 that is connected by a flexible cable 26 to the rudder 27 of the aircraft. The motor shaft 23 is also connected to a contact 28 which is engageable with a potentiometer 29 that is connected across a pair of voltage sources $E_e$ and $E_f$ which have their connection point grounded. The contact 28 is electrically connected to the servo amplifier 21. The filter is chosen so as to have a time constant which is considerably greater than the yawing time constant of the aircraft and which might be, for example, five seconds.

In Figure 2 signals from a bank pick-off are added algebraically to signals from a rate measuring gyro pick-off and the sum passed through a filter consisting of $R_1$ and $C_1$. The servo system positions the rudder proportional to the output of the filter. If the aircraft is making a coordinated turn at some particular air speed, the signal from the bank pick-off is exactly equal to the signal from the rate gyroscope pick-off, and the rudder is allowed to remain in its streamlined position. Now if the air speed is changed, the bank angle signal is not equal to the rate of turn signal. However, the difference would be a constant of essentially zero frequency and would not be capable of passing through the filter $R_1C_1$ and causing an undesired rudder deflection. It is to be remembered that no rudder should be held at any speed after the turn is established. This invention assures this result.

In operation when a turn is desired, the ailerons of the aircraft are moved to start a bank which produces a signal across the potentiometer 13 which is fed by the contact 12 to the rate of turn pick-up potentiometer 16. Since the filter 19 is primarily a differentiating circuit, the rate of change of the bank angle signal will pass through the filter and supply a control signal to the servomotor 22. In a similar manner the rate of change of the rate of turn signal will pass through the filter 19. For correct control at all air speeds, the rate of change of the bank signal will be equal to the rate of change of the rate of turn signal.

Once the bank angle is established, the contact 13 will not move and the rate of turn contact 16 will also be stabilized. There will therefore be no transients caused by rates of change of these signals which will pass through the filter 19 and the closed servo loop comprising the servo output shaft 23 and the potentiometer 29 will bring the rudder to zero. This will be true even though a direct current signal may exist across the condenser $C_1$. The condenser will not let a direct current signal pass. When it is desired to discontinue the turn, the ailerons are actuated causing a rate of change of bank signal and a rate of change of the rate of turn signal, both of which will pass through the filter to control the servomotor.

The advantages of this apparatus over the conventional structure where no filter is included, is that the present system automatically coordinates the controls for all air speeds, whereas the conventional system coordinates at only one air speed and if the air speed is varied from this reference, the rudder will be held away from the zero position after the turn is established. The insertion of the filter in my invention allows only the transients or rate of changes of the control signals to pass and therefore errors caused by changes in velocity are removed, thus assuring coordinated flight at all times.

Although the invention has been described with respect to particular embodiments thereof, it is not to be so limited as changes and modifications may be made therein which are within the full intended scope of the invention, as defined by the appended claims.

I claim:

1. Means for coordinating the control surfaces of an aircraft at all airspeeds comprising, three potentiometers, a vertical gyro connected to the first potentiometer and producing an output proportional to the bank angle, the output of the first potentiometer connected to the second potentiometer, a rate of turn gyro connected to control the second potentiometer, a high pass filter connected to the output of the second potentiometer, a servomotor receiving the output of the high pass filter, the output shaft of said servomotor connected to the third potentiometer, the output of the three potentiometers connected to said servomotor, and a control surface of said aircraft connected to said servomotor.

2. Means for returning the rudder of an aircraft to the streamlined position comprising, first, second and third potentiometers, voltage sources connected to said first, second and third potentiometers, a vertical gyro connected to control the position of the first potentiometer, a rate of turn gyro connected to control the position of the second potentiometer, a servomotor with its output shaft connected to control the position of said rudder and also connected to said third potentiometer, the output of the first potentiometer connected to the second potentiometer, a high pass filter connected to the output of the second potentiometer, a servo amplifier connected to the outputs of the high pass filter and the third potentiometer, and the output of the servo amplifier connected to said servomotor.

3. Means for causing the rudder of an aircraft to return to the neutral position comprising, first, second and third potentiometers comprising, resistors and slide contacts engageable with said resistors, voltage sources connected across said first, second and third potentiometers, a vertical gyro connected to the slide contact of the first potentiometer, the output of the first potentiometer connected to the second potentiometer, a rate of turn gyro connected to the slide contact of the second potentiometer, a high pass filter connected to the slide contact of the second potentiometer, a servo amplifier connected to the high pass filter and to the slide contact of the third potentiometer, a servomotor receiving an electrical input from the servo amplifier and its output shaft connected to the slide contact of the third potentiometer and coupled to the rudder of said aircraft.

4. Means for causing the rudder of an aircraft to return to the neutral position comprising, first, second and third potentiometers comprising, resistors and slide contacts engageable with said resistors, first, second and third voltage sources connected to the potentiometers, a vertical gyro connected to the slide contact of the first potentiometer, the output of the first potentiometer connected to the second potentiometer, a rate of turn gyro connected to the slide contact of the second potentiometer, a high pass filter connected to the slide contact of the second potentiometer, a servo amplifier connected to the high pass filter and to the slide contact of the third potentiometer, a servomotor receiving an electrical input from the servo amplifier and with its output shaft connected to the slide contact of the third potentiometer and coupled to the rudder of said aircraft.

5. Means for causing the rudder of an aircraft to return to the neutral position comprising, first, second and third potentiometers comprising, resistors and slide contact engageable with said resistors, voltage sources connected across said first, second and third potentiometers, a vertical gyro connected to the slide contact of the first potentiometer, the output of the first potentiometer connected to the second potentiometer, a rate of turn gyro connected to the slide contact of the second potentiometer, a high pass filter connected to the slide contact of the second potentiometer and the time constant of said high pass filter being substantially greater than the natural yawing time constant of said aircraft, a servo amplifier connected to the high pass filter and to the slide contact of the third potentiometer, a servomotor receiving an electrical input from the servo amplifier and with its output shaft connected to the slide contact of the third potentiometer and coupled to the rudder of said aircraft.

6. Means for causing the rudder of an aircraft to return to the neutral position comprising, first, second and third potentiometers comprising, resistors and slide contacts engageable with said resistors, first, second and third voltage sources connected to the potentiometers, a vertical gyro connected to the slide contact of the first potentiometer, the output of the first potentiometer connected to the second potentiometer, a rate of turn gyro connected to the slide contact of the second potentiometer, a high pass filter connected to the slide contact of the second potentiometer and the time constant of said high pass filter being substantially greater than the natural yawing time constant of said aircraft, a servo amplifier connected to the high pass filter and to the slide contact of the third potentiometer, a servomotor receiving an electrical input from the servo amplifier and with its ouput shaft connected to the slide contact of the third potentiometer and coupled to the rudder of said aircraft.

7. Rudder control for aircraft for assuring coordinated turns for all air speeds comprising means for deriving a first signal voltage proportional to the bank angle of the craft, means for deriving a second signal voltage proportional to the rate of turn of said craft, circuit means for differentially combining said signal voltages, differentiating means connected to said circuit means for providing a rudder control voltage proportional to the time rate of change of the difference between the said signal voltages, servo means for displacing said rudder, and means for applying said rudder control voltage to said servo means.

8. Rudder control for aircraft for assuring coordinated turns for all air speeds comprising means for deriving a first signal voltage proportional to bank angle of the craft, means for deriving a second signal voltage proportional to the rate of turn of said craft, circuit means for differentially combining said signal voltages, differentiating means connected to said circuit means for providing a rudder control voltage proportional to the time rate of change of the difference between said signal voltages, servo means for displacing said rudder, means for deriving a feed-back voltage proportional to rudder displacement, and means for applying said control voltage and said feed-back voltage in opposition to said servo means.

9. The method for controlling the rudder of an aircraft to assure coordinated turns comprising developing a first signal proportional to the bank angle of said craft, developing a second signal proportional to the rate of turn of said craft, deriving a control signal proportional to the time rate of change of the difference between said first and second signals, and displacing the said rudder an amount proportional to the magnitude of said control signal.

References Cited in the file of this patent

UNITED STATES PATENTS

| | | |
|---|---|---|
| 2,586,034 | Halpert | Feb. 19, 1952 |
| 2,615,658 | Young | Oct. 28, 1952 |
| 2,626,114 | Alderson | Jan. 20, 1953 |
| 2,630,282 | Halpert | Mar. 3, 1953 |